US011650592B2

(12) United States Patent
Witt et al.

(10) Patent No.: US 11,650,592 B2
(45) Date of Patent: *May 16, 2023

(54) SEMANTIC MAPPING OF ENVIRONMENTS FOR AUTONOMOUS DEVICES

(71) Applicant: X Development LLC, Mountain View, CA (US)

(72) Inventors: Jonas Witt, Palo Alto, CA (US); Elmar Mair, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 17/001,259

(22) Filed: Aug. 24, 2020

(65) Prior Publication Data

US 2021/0041881 A1 Feb. 11, 2021

Related U.S. Application Data

(63) Continuation of application No. 15/897,568, filed on Feb. 15, 2018, now Pat. No. 10,754,343.

(51) Int. Cl.
*B25J 9/16* (2006.01)
*G05D 1/02* (2020.01)
(Continued)

(52) U.S. Cl.
CPC ............ *G05D 1/0221* (2013.01); *B25J 9/162* (2013.01); *B25J 9/163* (2013.01); *B25J 9/1664* (2013.01);
(Continued)

(58) Field of Classification Search
CPC .. G05D 1/0221; G05D 1/0246; G05D 1/0231; G05D 1/0274; G05D 1/0287;
(Continued)

(56) References Cited

U.S. PATENT DOCUMENTS 8,214,079 B2 7/2012 Lee et al.
8,396,254 B1 3/2013 Hickman
(Continued)

OTHER PUBLICATIONS

Toris et al., Temporal persistence modeling for object search, 2017, IEEE, p. 3215-3222 (Year: 2017).*
(Continued)

*Primary Examiner* — McDieunel Marc
(74) *Attorney, Agent, or Firm* — McDonnell Boehnen Hulbert & Berghoff LLP

(57) ABSTRACT

Methods, systems, and apparatus for receiving a reference to an object located in an environment of a robot, accessing mapping data that indicates, for each of a plurality of object instances, respective probabilities of the object instance being located at one or more locations in the environment, wherein the respective probabilities are based at least on an amount of time that has passed since a prior observation of the object instance was made, identifying one or more particular object instances that correspond to the referenced object, determining, based at least on the mapping data, the respective probabilities of the one or more particular object instances being located at the one or more locations in the environment, selecting, based at least on the respective probabilities, a particular location in the environment where the referenced object is most likely located, and directing the robot to navigate to the particular location.

20 Claims, 5 Drawing Sheets

(51) Int. Cl.

| | |
|---|---|
| *G06N 7/00* | (2023.01) |
| *G05D 1/00* | (2006.01) |
| *G06Q 10/087* | (2023.01) |
| *G01C 21/20* | (2006.01) |
| *G06Q 10/08* | (2023.01) |
| *G06V 20/20* | (2022.01) |
| *G01C 21/00* | (2006.01) |

(52) U.S. Cl.
CPC ....... *G01C 21/206* (2013.01); *G01C 21/3837* (2020.08); *G05D 1/0088* (2013.01); *G05D 1/0231* (2013.01); *G05D 1/0246* (2013.01); *G05D 1/0274* (2013.01); *G05D 1/0287* (2013.01); *G06N 7/005* (2013.01); *G06Q 10/08* (2013.01); *G06Q 10/087* (2013.01); *G06V 20/20* (2022.01); *Y10S 901/01* (2013.01); *Y10S 901/47* (2013.01)

(58) Field of Classification Search
CPC .... G05D 1/0088; G01C 21/206; G01C 21/32; G01C 21/383; G06N 7/005; B25J 9/1664; B25J 9/163; B25J 9/162; G06Q 10/08; G06Q 10/087; G06V 20/20; Y10S 901/01; Y10S 901/47
See application file for complete search history.

(56) References Cited

U.S. PATENT DOCUMENTS

| | | | |
|---|---|---|---|
| 8,432,443 B2 | 4/2013 | Nam et al. | |
| 9,129,148 B1 | 9/2015 | Li et al. | |
| 9,327,406 B1 | 5/2016 | Hinterstoisser | |
| 9,400,503 B2 | 7/2016 | Kearns et al. | |
| 9,574,883 B2 | 2/2017 | Watts et al. | |
| 9,600,768 B1 | 3/2017 | Ferguson | |
| 9,691,151 B1 | 6/2017 | Anderson-Sprecher | |
| 9,751,212 B1 | 9/2017 | Martinson et al. | |
| 9,862,090 B2 | 1/2018 | Kennedy | |
| 9,875,648 B2 * | 1/2018 | Govers | B25J 9/1694 |
| 9,886,035 B1 * | 2/2018 | Watts | G05D 1/0251 |
| 9,894,483 B2 * | 2/2018 | Kokkonen | H04W 4/33 |
| 9,914,218 B2 * | 3/2018 | Ota | G05D 1/0088 |
| 9,956,687 B2 * | 5/2018 | Florencio | B25J 9/1694 |
| 10,127,677 B1 | 11/2018 | Anderson-Sprecher | |
| 10,165,722 B2 | 1/2019 | Ackerman | |
| 10,591,918 B2 * | 3/2020 | Jen | G05D 1/0276 |
| 10,606,269 B2 * | 3/2020 | Millard | G01C 21/20 |
| 10,754,343 B2 * | 8/2020 | Witt | B25J 9/163 |
| 10,823,572 B2 * | 11/2020 | Huang | G05D 1/0212 |
| 11,003,188 B2 * | 5/2021 | Scott | G05D 1/0214 |
| 11,042,748 B2 * | 6/2021 | Witt | G06V 10/764 |
| 2021/0339399 A1 * | 11/2021 | Schluntz | B25J 5/00 |

OTHER PUBLICATIONS

Clingerman et al., Toris et al., Temporal persistence modeling, 2014, IEEE, p. 2771-2778 (Year: 2014).*
Glasgow et al., Optimizing Information Value: Improving Rover Sensor Data Collection, 2008, IEEE, pg. (Year: 2008).*
Bordallo et al., Counterfactual reasoning about intent for interactive navigation in dynamic environments, 2015, IEEE, p. 2943-2950 (Year: 2015).*
Althaus et al., "Behavior coordination in structured environments," Advanced Robotics Col. Jan. 2003, 17(7):19 pages.
Anati, "Semantic Localization and Mapping in Robot Vision," Publicly Accessible Penn Dissertations, Jan. 1, 2016, 1587:1-172.
Anguelov et al., "Learning Hierarchical Object Maps Of Non-Stationary Environments With Mobile Robots," Proceedings of the 18th conference on Uncertainty in artificial intelligence, Aug. 2002, pp. 1-8.
Biswas et al., "Model-Instance Object Mapping," Carnegie Mellon University Research Showcase at CMY, Computer Science Department, Jul. 2014, 13 pages.
Bloch et al., "On the Representation of Fuzzy Spatial Relations in Robot Maps," Intelligent Systems for Information Processing 2003, pp. 1-11.
Bore et al., "Detection and Tracking of General Movable Objects in Large 3D Maps," CoRR, dated Jan. 30, 2018, arXiv1712.08409, 14 pages.
Bore, "Object Instance Detection and Dynamics Modeling in a Long-Term Mobile Robot Context," Doctoral Dissertation, KTH Royal Institute of Technology, 2017, 68 pages.
Buschka et al., "A Virtual Sensor for Room Detection," IEEE/RSJ International Conference on Intelligent Robots and Systems, 2002, 6 pages.
Choi et al., "Automated Space Classification for Network Robots in Ubiquitous Environments," Journal of Sensors, Nov. 2014, 2015(954920): 9 pages.
Espinace et al., "Indoor scene recognition bv a mobile robot through adaptive object detection," Robotics and Autonomous Systems, Sep. 2013, 61(9): 16 pages.
Gallagher et al., "GATMO: a generalized approach to tracking movable objects," IEEE Xplore, May 2009, 6 pages.
Garcia-Garcia et al., "A review on deep learning techniques applied to semantic segmentation," CoRR, Apr. 2017, arXiv1704.06857, 23 pages.
Guo et al., "3D mesh labeling via deep convolutional neural networks," ACM Transactions on Graphics, Dec. 2015, 35(1): 12 pages.
Hanel et al., "Mobile robot mapping in populated environments," Advanced Robotics, Jan. 2003, 17(7): 14 pages.
Kahn et al., "Biologically Inspired Machines: Mapping and Localization," Dec. 11, 2002, Retrieved from Internet: URL< http://www.ai.mit.edu/courses/16.412J/final%20projects/BIML-Kahn_Mazor.doc, 9 pages.
Koenig et al., "Xavier: A robot navigation architecture based on partially observable markov decision process models," Artificial Intelligence Based Mobile Robotics: Case Studies of Successful Robot Systems, May 1998, 24 pages.
Krajnik, et al., "Spectral Analysis for Long-Term Robotic Mapping," IEEE International Conference on Robotics and Automation, May 2014, pp. 1-8.
Kuipers et al., "Bootstrap learning for place recognition," Proceedings of the 18th National Conference on Artificial Intelligence, Jul. 2002, 7 pages.
Kunze et al., "Searching objects in large-scale indoor environments: A decision-theoretic approach," IEEE, 2012, pp. 4385-4390.
Li, "First Formulation of SLAM," presentation. University of South Carolina, Sep. 22, 2015, Retrieved from Internet<URL https://cse.sc.edu/~yiannisr/774/2015/Smith.pdf, 37 slides.
Limketkai et al., "Relational Object Maps for Mobile Robots," IJCAI, Jul. 2005, 6 pages.
Little, "Finding Objects in Cluttered Scenes for Home Robotics," Presentation, Laboratory for Computational Intelligence, Computer Science, UBC Vancouver, 91 slides.
Maturana et al., "VoxNet: a 3D convolutional neural network for real-time object recognition," IEEE/RSJ International Conference on Intelligent Robots and Systems, Sep. 2015, 7 pages.
McCormac et al., "SemanticFusion: Dense 3D Semantic Mapping with Convolutional Neural Networks," IEEE International Conference on Robotics and Automation, May 2017, 8 pages.
Mozos, "Semantic Labeling of Places with Mobile Robots," Heidelberg: Springer, Jan. 2010, 61: 176 pages.
Mueller et al., "Object-related-navigation for mobile robots," IEEE, 2012, pp. 1-8.
Paszke et al., "ENet: a deep neural network architecture for real-time semantic segmentation," Under review as a conference paper at ICLR, 2017, 10 pages.
PCT International Search Report and Written Opinion in International Appln. No. PCT/US2019/018315, dated May 20, 2019, 16 pages.
Pronobis et al., "Large-scale semantic mapping and reasoning with heterogeneous modalities," IEEE Xplore, May 2012, 8 pages.

(56) References Cited

OTHER PUBLICATIONS

Pronobis et al., "A realistic benchmark for visual indoor place recognition," Robotics and Autonomous Systems, Jan. 31, 2010, 58(1): 17 pages.
Pronobis et al., "Multi-modal Semantic Place Classification," The International Journal of Robotics Research, Dec. 4, 2009, 24 pages.
Qi et al., "PointNet: Deep Learning on Point Sets for 3D Classification and Segmentation," Conference on Computer Vision and Pattern Recognition (CVPR) 2017, Slides, 4 pages.
Riazuelo et al., "RoboEarth Semantic Mapping: A Cloud Enabled Knowledge-Based Approach," IEEE, 2015, pp. 432-443.
Ribes et ai., "Object-based Place Recognition for Mobile Robots Using Panoramas," Artificial Intelligence Research and Developments: Proceedings of the 11th International Conference of the Catalan Association for Artificial Intelligence, Oct. 2008, 184: 8 pages.
Rottmann et al., "Semantic Place Classification of Indoor Environments with Mobile Robots using Boosting," AAAI, Jul. 2005, 5: 6 pages.
Rusu et al., "Model-based and learned semantic object labeling in 3d point cloud maps of kitchen environments," IEEE/RSJ International Conference on Intelligent Robots and Systems, Oct. 2009, 9 pages.
stanford.edu [online] "PointNet: Deep learning on point sets for 3D classification and segmentation" Presentation, Stanford University, Available on or before 2017 [retrieved on Feb. 20, 2018] 68 Slides.
Tenorth et al., "KNOWROB-MAP—knowledge-linked semantic object maps," IEEE, 2010, pp. 430-435.
Torralba et al., "Context-based vision system for place and object recognition," IEEE, Oct. 2003, 11 pages.
Vasudevan "Cognitive Maps for Mobile Robots," Robotics and Autonomous Systems 55.5, May 2007, 13 pages.
Wang et al., "Scene classification with deep convolutional neural networks," 2017, Retrieved on Feb. 9, 2018, Retrieved from the Internet: URL< https://pdfs.semanticscholar.org/05b3/d0ece3c05be45b1ae7db3b43123befae3474.pdf> 7 pages.
Yu et al., "CASENet: deep categorv-aware semantic edge detection," CoRR, May 2017, arXiv1705.09759v1, 16 pages.

* cited by examiner

SEMANTIC MAPPING OF ENVIRONMENTS FOR AUTONOMOUS DEVICES

CROSS-REFERENCE TO RELATED APPLICATIONS

This application is a continuation of U.S. application Ser. No. 17/001,259, filed Aug. 24, 2020, the entire contents of which are incorporated by reference herein.

TECHNICAL FIELD

This application relates generally to environment mapping.

BACKGROUND

Robotic mapping concerns the creation and use of environment mappings by robotic systems, such as autonomous robots. An environment, such as a property, can be represented using a two-dimensional (2D) plan mapping or a three-dimensional (3D) space mapping that provides a 3D representation of the interior of the environment. Autonomous robots utilize environment mappings to perform object location, path planning, and navigation within an environment, as well as to interact with objects within the environment. Given a location of the autonomous robot within the environment property and a location of a destination within the environment, such as a location of a target object in the environment, the autonomous robot can plan a path to navigate through the property to its destination.

SUMMARY

This specification relates to systems, methods, devices, and other techniques for mapping the locations of objects within an environment, and to generating a mapping of objects within the environment that specifies the probabilities of the objects being located in specific locations at specific points in time. Environment mappings that identify specific object instances and time-varying probabilities of object instances being in particular locations within the property are referred to as lifelong semantic mappings. For example, a lifelong semantic mapping of a property may indicate a relatively certain and static probability for a location of a wall, since walls are not likely to move over time, while the lifelong semantic mapping may indicate that the certainty of a location of a cup in the property decreases rapidly over time, eventually tending towards zero. Applications of lifelong semantic mapping techniques can enable robotic systems, such as autonomous robots, to locate specific objects within an environment, and to navigate through an environment, with improved accuracy.

As referred to herein, semantic mapping generally refers to a mapping process that considers characteristics of specific object instances or classes of objects in determining and predicting the locations of object instances within an environment. A semantic mapping of an environment may identify each object instance in an environment. Based on the characteristics of each object instance or a class corresponding to the object instance, the semantic mapping may specify one or more probabilities of the object instance being located in particular locations within the environment. A robotic system can use the semantic mapping to locate the object instance within the environment, for example, by determining to look for the object instance in the most probable locations within the environment first, before looking in locations where the object instance is less likely to be located.

For example, a semantic mapping of a property may include a television object instance and a coffee mug object instance. Locations of the television and the coffee mug may be estimated based on observations by one or more autonomous robots at the property. The locations of the television and the coffee mug in the property may be represented as probability functions indicating the each object's likelihood of being located in a particular location, where the probability functions consider characteristics of each object or their relationship to other objects. For example, because a television is a class of object that is not frequently moved, the probability of the television being located where it was last seen by an autonomous robot may go relatively unchanged over time. In contrast, because a coffee mug is a class of object that is frequently moved, the probability of the coffee mug being located where it was last seen by an autonomous robot may decrease relatively quickly over time.

In some implementations, a semantic mapping of an environment may specify multiple probabilities for a particular object instance. Each probability may correspond to a particular location within the environment where the object instance may be located. For example, two autonomous robots may each detect an object that they each recognize as a particular object instance in different locations within a property around the same time. Since it is likely that one identification of the object instance was accurate while the other was an erroneous identification of the object instance, a semantic mapping of the property may specify two probabilities for the object instance.

Each probability may be a probability function that indicates the likelihood that the object instance is located in the corresponding location within the property, and may be determined based on, for example, a confidence of the identification of the object by the autonomous robot, characteristics of the object instance or the class of the object, such as how often the object instance is moved or seen at a particular location within the property, or other information, such as the proximity of the object instance to another related object instance.

A semantic mapping of an environment that provides one or more probabilities corresponding to potential locations of a particular object instance can improve the capabilities of a robotic system to locate objects within an environment. For example, rather than a static mapping of the environment that does not change over time, new static mappings may be generated that replace older mappings over time as new observations of the environment are made. In some implementations, an age of a mapping may even be considered in determining the likelihood of the mapping being accurate. However, such mappings do not distinguish between particular object instances located within the environment, nor do they consider alternate possible locations of an object instance within an environment, or the likelihood of the object instance being located at each of those possible locations.

For example, a static mapping of a property may not consider the transient nature of a coffee mug versus a television, or provide alternate possible locations of the coffee mug within the property. If a robotic system relying on the static mapping fails to locate the coffee mug within the property, i.e., at the location indicated by the static mapping, the robotic system is forced to aimlessly search for the coffee mug within the property until it finds it. In contrast, a semantic mapping as disclosed herein may provide the robotic system with alternate locations where the coffee mug might be located within the property, and a probability of the coffee mug being located in any particular location may inform the scope of the robotic system's search for the coffee mug within the property.

Innovative aspects of the subject matter described in this specification may be embodied in methods, systems, and computer-readable devices storing instructions configured to perform the actions of receiving, by a system configured to facilitate operation of a robot in an environment, a reference to an object located in the environment of the robot, accessing, by the system, mapping data that indicates, for each of a plurality of object instances, respective probabilities of the object instance being located at one or more locations in the environment, wherein the respective probabilities of the object instance being located at each of the one or more locations in the environment are based at least on an amount of time that has passed since a prior observation of the object instance was made, identifying, by the system and from among the plurality of object instances, one or more particular object instances that correspond to the referenced object, determining, by the system and based at least on the mapping data, the respective probabilities of the one or more particular object instances being located at the one or more locations in the environment, selecting, by the system and based at least on the respective probabilities of the one or more particular object instances being located at the one or more locations in the environment, a particular location in the environment where the referenced object is most likely located, and directing, by the system, the robot to navigate to the particular location.

These and other embodiments may each optionally include one or more of the following features. In various examples, each of the plurality of object instances is an instance of an object class; the features include controlling, by the system, navigation of the robot to the particular location; the respective probabilities of an object instance being located at one or more locations in the environment are based at least on a temporal characteristic associated with an object class of the object instance; the respective probabilities of an object instance being located at one or more locations in the environment are based at least on a spatial relationship between the object instance and one or more other object instances; the respective probabilities of an object instance being located at one or more locations in the environment are based at least on a relationship between an object class of the object instance and an area type of a location associated with the probability; the respective probabilities of an object instance being located at one or more locations in the environment are based at least on a spatiotemporal relationship between an object class of the object instance and a location associated with the probability; the respective probabilities of an object instance being located at one or more locations in the environment are based at least on an identification confidence associated with one or more prior observations of the object instance; the mapping data is generated based on observations of a plurality of robots; the system accesses the mapping data at a cloud-based computing system.

The details of one or more embodiments of the subject matter described in this specification are set forth in the accompanying drawings and the description below. Other potential features, aspects, and advantages of the subject matter will become apparent from these description, the drawings, and the claims.

BRIEF DESCRIPTION OF THE DRAWINGS

Like reference symbols in the various drawings indicate like elements.

DETAILED DESCRIPTION

Figure 1A:
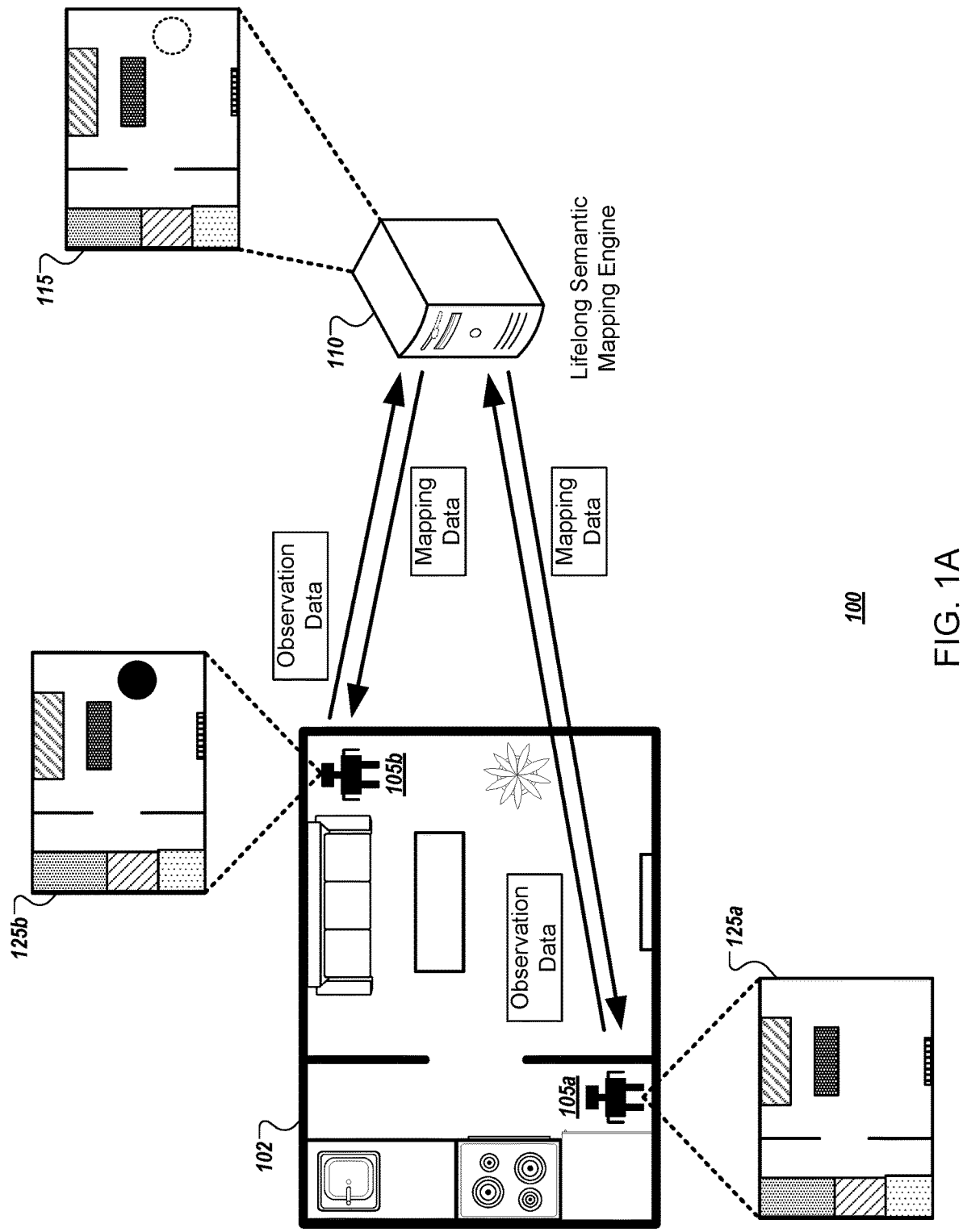
FIGS. 1A-1B depict example systems for mapping an environment.

A robotic mapping of an environment, such as a property, can be represented using a two-dimensional (2D) plan mapping or a three-dimensional (3D) space mapping that provides a 3D representation of the interior of the environment. Environment mappings may be metric representations, in which structures and objects within the environment are associated with coordinate locations or boundaries, or may be topological representations in which structures and objects are defined based on relationships between them, such as the distances and angles between the various objects and boundaries within the environment. Environment mappings may represent the free space within an environment, i.e., the areas of the environment where an autonomous robot is permitted to move, may represent objects within an environment, i.e., the areas of the environment that are occupied by other structures or objects and therefore represent where an autonomous robot is not permitted to move, or may be composite mappings that represent both the free space and objects within an environment.

Environment mappings, once determined, can be maintained as static mappings that do not change over time. In some implementations, a level of confidence that an environment mapping is accurate may be determined based on how recently the mapping was generated or how recently information used to generate the mapping was obtained. For example, a mapping of a property that is generated based on dated information, such as observations by an autonomous robot that occurred several months ago, may have an associated confidence that is lower compared to a mapping of the same property that is generated based on more recent information, such as observations by an autonomous robot occurring only several days ago.

Autonomous robots utilize environment mappings to perform object location, path planning and navigation within an environment. Given a location of the autonomous robot within the environment property and a location of a destination within the environment, such as a location of a target object in the environment, the autonomous robot can plan a path to navigate through the property to its destination. In some instances, a robot's location within an environment can be provided to the autonomous robot, for example, by another system or a human user. In other implementations, an autonomous robot performs localization to determine its location within the environment. Localization is traditionally performed, for example, by determining the proximity of the autonomous robot to one or more proximity beacons, using near-field communication NFC), based on detecting a particular wireless free internet (WiFi) network or the strength of a particular WiFi network, using visible light communication (VLC), or based on detecting a particular Bluetooth connection or strength of Bluetooth connection.

However, even with accurate localization, an autonomous robot that is relying on an outdated or uncertain mapping of an environment may have difficulty in performing tasks due to a failure to locate target objects within the environment. For example, if a mapping of an environment is sufficiently outdated such that an autonomous robot has very limited confidence in the mapping, the robotic system may have difficulty navigating through and locating objects within the environment.

To address this, a robotic mapping as described herein may consider characteristics of specific objects within an environment to provide a lifelong mapping of the environment, that is, a mapping that considers the typical usage and characteristics of objects within an environment. By doing so, the robotic mapping can more accurately describe the locations of specific objects within the mapping. Specifically, because objects may have different characteristics in terms of their useful lifetime, i.e., how long a user of the property keeps an object before disposing of it, their mobility, i.e., how often users move an object, their relationships to other objects, etc., modeling each object's location within a space can improve the ability of a robot to predict the location of an object within an environment and to navigate through the environment to that object.

FIG. 1A depicts an example system 100 for generating and using a lifelong semantic mapping of an environment. Generally, the system 100 includes one or more autonomous robots 105a, 105b located at an environment 102, such as a residential or commercial property. The autonomous robots 105a, 105b are in communication with a lifelong semantic mapping engine 110. The autonomous robots 105a, 105b communicate with the lifelong semantic mapping engine 110 over one or more wired or wireless communication links, for example, over one or more wired or wireless local area networks (LANs) or wide area networks (WANs).

As shown in FIG. 1A, the lifelong semantic mapping engine 110 stores a semantic mapping 115 of the environment 102 that specifies the locations of object instances, including, for example, a counter, sink, stove, refrigerator, sofa, table, and television within the environment 102. Each of the object instances represented in the semantic mapping 115 is associated with a probability of the object instance being located at a particular location within the environment 102. For example, each object instance represented in the semantic mapping 115 may be associated with a corresponding probability function that indicates the probability of the object instance being located in a particular location at any given time.

The lifelong semantic mapping engine 110 can update the semantic mapping 115 based on information received from the autonomous robots 105a, 105b. For example, each of the autonomous robots 105a, 105b may be equipped with one or more sensors or cameras for obtaining observations from the environment 102. The autonomous robots 105a, 105b may transmit observation data corresponding to sensor, image, or video data captured by the sensors or cameras of the autonomous robots 105a, 105b to the lifelong semantic mapping engine 110. Based on the observation data, the lifelong semantic mapping engine 110 can update the semantic mapping 115 to more accurately reflect the configuration of the environment 102.

In some instances, an autonomous robot 105a, 105b only transmits observation data to the lifelong semantic mapping engine 110 if the autonomous robot 105a, 105b determines that its observation is sufficiently significant to warrant transmission to the lifelong semantic mapping engine 110, i.e., that the observation is important and should therefore be addressed by or incorporated into the semantic mapping 115. For example, an observation that a table has been angled slightly but is generally in the same location may not be significant and may therefore not be an observation that is transmitted to the lifelong semantic mapping engine 110. However, an observation of a plant that was not previously included in the semantic mapping 115 may be considered sufficiently important by the autonomous robot 105a, 105b to warrant providing observation data indicating the plant to the lifelong semantic mapping engine 110. Based on the lifelong semantic mapping engine 110 receiving observation data from the autonomous robot 105a, 105b, the lifelong semantic mapping engine 110 can update the semantic mapping 115 to include the plant.

In other implementations, the lifelong semantic mapping engine 110 may receive other information in addition to the observation data provided by the autonomous robots 105a, 105b, and may update the semantic mapping 115 based on the other information. The other information may include, for example, user corrections or object rules provided by users of the environment 102. The other information may be received by the lifelong semantic mapping engine 110 from the autonomous robots 105a, 105b, or from another system, such as from another server that is in communication with the lifelong semantic mapping engine 110.

For example, a user of the environment 102 may provide a request to an autonomous robot 105a, 105b that identifies a particular object instance. The autonomous robot 105a, 105b may proceed to navigate to a location of an object instance that it identifies, based on its local semantic mapping 125a, 125b, to be the location of the particular object instance. The user of the environment 102 may then correct the autonomous robot 105a, 105b to indicate that the object instance that the autonomous robot 105a, 105b identified is not the particular object instance requested, and optionally identifies a different object instance as the particular object instance requested. In response, the autonomous robot 105a, 105b can update its local semantic mapping 125a, 125b to include the correction, and may also transmit information to the lifelong semantic mapping engine 110 indicating the correction so that the lifelong semantic mapping engine 110 can update the semantic mapping 115 accordingly.

Similarly, the user of the environment 102 may provide rules regarding specific object instances within the environment 102. For example, a user of the environment 102 may indicate that a particular object instance, such as a coffee mug or laptop computer, should be moved from one location within the environment 102 to another location within the environment 102 at a particular time of day, e.g., from a living room where the user might use the laptop computer in the evening, to a home office where they use the laptop computer during the day. The user may provide such a rule either directly to the autonomous robot 105a, 105b, or at another system, such as at an interface for the system 100 that is provided at another computer system. Information indicating the rule may be provided to the lifelong semantic mapping engine 110, for example, from the autonomous robot 105a, 105b to which the user provided the rule, so that the lifelong semantic mapping engine 110 can update the semantic mapping 115.

Updating the semantic mapping 115 may include adding new object instances observed by the autonomous robots 105a, 105b in the environment 102 to the semantic mapping 115, may include adjusting the locations of object instances in the semantic mapping 115 based on observations by the autonomous robots 105a, 105b, or can include removing object instances from the semantic mapping 115 based on observations by the autonomous robots 105a, 105b. The lifelong semantic mapping engine 110 can also modify the semantic mapping 115 by adjusting probabilities associated with object instances represented in the semantic mapping 115. For example, if an autonomous robot 105a, 105b observes a table object in a location of the environment 102, the autonomous robot 105a, 105b may transmit observation data to the lifelong semantic mapping engine 110 indicating that observation. In response, the lifelong semantic mapping engine 110 may increase a probability or adjust a probability function associated with the table to indicate that the table is most likely located in that particular location.

In some implementations, the lifelong semantic mapping engine 110 continuously updates the semantic mapping 115 as observation data is received from the autonomous robots 105a, 105b. In other implementations, the lifelong semantic mapping engine 110 may periodically updated the semantic mapping 115, or may update the semantic mapping 115 once a threshold amount of observation data or a threshold number of changes to the semantic mapping 115 are required.

The lifelong semantic mapping engine 110 can provide an updated semantic mapping 115 to each of the autonomous robots 105a, 105b. For example, the lifelong semantic mapping engine 110 may update the semantic mapping 115 and provide the updated semantic mapping 115 to each or a subset of the autonomous robots 105a, 105b. The autonomous robots 105a, 105b receive mapping data corresponding to the semantic mapping 115 and store local semantic mappings 125a, 125b that correspond to the semantic mapping 115. For example, the lifelong semantic mapping engine 110 may continuously or periodically update the semantic mapping 115. The lifelong semantic mapping engine 110 may provide mapping data corresponding to the updated semantic mapping 115 to the autonomous robots 105a, 105b, such that each of the autonomous robots 105a, 105b can receive the semantic mapping 115 and store the semantic mapping 115 as a local semantic mapping 125a, 125b.

After storing the semantic mapping 115 as a local semantic mapping 125a, 125b, each autonomous robot 105a, 105b can independently update its local semantic mapping 125a, 125b based on its observations. By updating its local semantic mapping 125a, 125b based on local observations, the autonomous robot 105a, 105b can interact with objects in the environment 102 with improved accuracy. Updates made to the local semantic mapping 125a, 125b may be later provided to the lifelong semantic mapping engine 110 as observation data for updating the semantic mapping 115. In some implementations, as discussed above, the autonomous robots 105a, 105b may transmit all or only a portion of the updates to its local semantic mapping 125a, 125b to the lifelong semantic mapping engine 110 to incorporate those updates into the semantic mapping 115, based on the importance of the updates to the local semantic mapping 125a, 125b.

For example, the lifelong semantic mapping engine 110 of FIG. 1A may generate a local semantic mapping 115 based on observation data received from each of the autonomous robots 105a, 105b located in the environment 102. The semantic mapping 115 may include, as shown, object instances for a counter and sink, stove, refrigerator, couch, table, and television, along with information defining boundaries and walls in the environment 102. The lifelong semantic mapping engine 110 can provide the semantic mapping 115 to each of the autonomous robots 105a, 105b, and each of the autonomous robots 105a, 105b can store the semantic mapping 115 as a local semantic mapping 125a, 125b.

Each autonomous robot 105a, 105b can then make updates as needed to its local semantic mapping 125a, 125b, based on their observations. Because of the location of the autonomous robot 105a in the environment 102, the autonomous robot 105a does not perceive any changes to the environment 102, and therefore does not make any updates to its local semantic mapping 125a. However, the autonomous robot 105b located in a living area of the environment 102 may observe a plant object instance that is not represented in the semantic mapping 115. Based on its observation, the autonomous robot 105b may update its local semantic mapping 125b to include an object instance corresponding to the plant. The autonomous robot 105b may further determine that the presence of the plant object instance in the living area of the environment 102 is a substantial change to the mapping of the environment 102, and may therefore provide observation data to the lifelong semantic mapping engine 110 indicating the location of the plant object instance. Based on the information, the lifelong semantic mapping engine 110 can update the semantic mapping 115 to include the plant object instance, as shown by the dotted lines in the semantic mapping 115 of FIG. 1A.

Figure 1B:
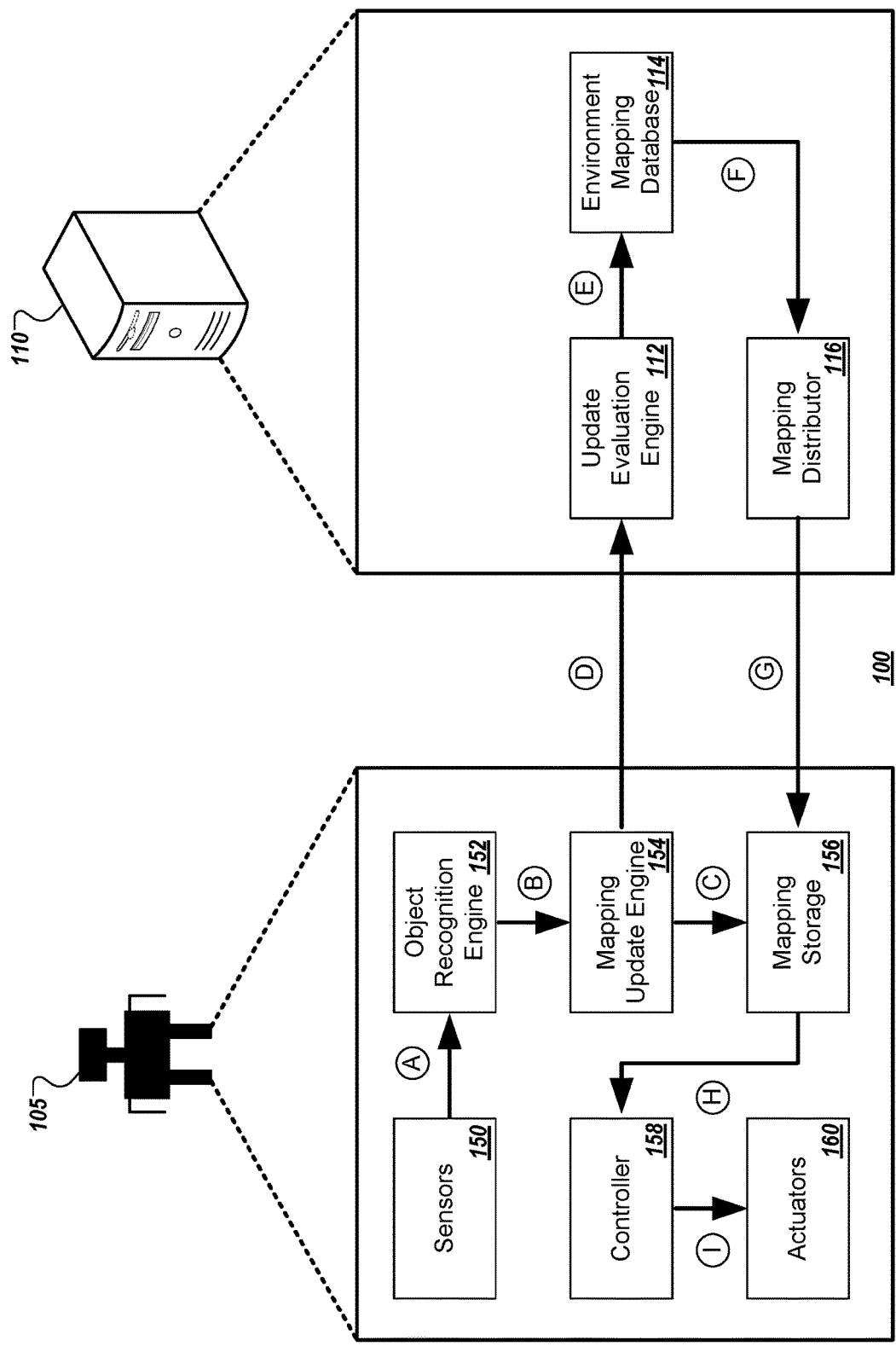

FIG. 1B depicts the example system 100 of FIG. 1A with additional detail. Specifically, FIG. 1B depicts an autonomous robot 105 in communication with the lifelong semantic mapping engine 110 over one or more wired or wireless networks, such as one or more LANs or WANs. Briefly, components of the autonomous robot 105 include one or more sensors 150, an object recognition engine 152, a mapping update engine 154, mapping storage 156, a controller 158 configured to control the autonomous robot 105, and one or more actuators 160 for effecting movement of the autonomous robot 105 and interaction of the autonomous robot 105 with objects in the environment 102. Components of the lifelong semantic mapping engine 110 include an update evaluation engine 112, an environment mapping database 114, and a mapping distributor 116.

While each of the components shown in FIG. 1B are shown as being internal to the autonomous robot 105 or the lifelong semantic mapping engine 110, in some implementations, components of either the autonomous robot 105 or lifelong semantic mapping engine 110 can be external to the autonomous robot 105 or lifelong semantic mapping engine 110. For example, the mapping storage 156 of the autonomous robot 105 may be located at a cloud-based storage environment accessible by the autonomous robot 105, or the environment mapping database 114 of the lifelong semantic mapping engine 110 may be located at a remote storage accessible to the lifelong semantic mapping engine 110. In some implementations, one or more of the components depicted may be combined into a single component or may be included elsewhere in the system 100. For example, in some implementations, the object recognition engine 152 of the autonomous robot 105 may be located at the lifelong semantic mapping engine 110.

The autonomous robot 105 and lifelong semantic mapping engine 110 can communicate to perform lifelong semantic mapping of the environment 102 of FIG. 1A. In the scenario shown in FIG. 1B, the lifelong semantic mapping engine 110 maintains a semantic mapping of the environment 102 at the environment mapping database 114, e.g., the semantic mapping 115 of FIG. 1A. The lifelong semantic mapping engine 110 has provided the autonomous robot 105 with the semantic mapping of the environment 102 to allow the autonomous robot 105 to navigate through and interact with the environment 102. The operations depicted in FIG. 1B enable the autonomous robot 105 to update its local semantic mapping of the environment 102 and to provide observation data to the lifelong semantic mapping engine 110 to permit updating of the semantic mapping stored at the environment mapping database 114 of the lifelong semantic mapping engine 110.

At stage (A) the one or more sensors 150 of the autonomous robot 105 transmit sensor data to the object recognition engine 152 of the autonomous robot 105. In some implementations, the one or more sensors 150 may include one or more devices capable of taking measurements of the environment, for example, one or more stereo cameras, light detection and ranging (LIDAR) sensors, sonar, radar, cameras or video cameras, or other forms of imaging or depth detection. The one or more sensors 150 can obtain measurements from the environment and information indicating locations within the environment 102 corresponding to the measurements, e.g., a location and orientation of the autonomous robot 105 from where the measurements were taken, or locations of the objects being detected by the one or more sensors 150.

For example, each measurement may indicate a location from which the measurement was taken by the autonomous robot 105, such as coordinates, latitude and longitude, or other location information that indicates a position of the autonomous robot 105 within the environment 102. The information may also indicate an orientation corresponding to the measurement, such as an indication of a direction from which the measurement was taken and an angle from which the measurement was taken. The measurements taken by the autonomous robots 105 may include a sufficient number of measurements to generate a 2D or 3D mapping of the observed portion of the environment 102.

The object recognition engine 152 can receive the sensor data and can identify objects in the environment 102 based on the received sensor data. The object recognition engine 152 may identify objects based on the geometry of objects depicted or described by the sensor data. For example, the object recognition engine 152 may have access to one or more object templates or object feature templates that specify features of classes of objects or specific object instances. The object recognition engine 152 may compare features derived from the sensor data to the templates to identify object instances depicted or described by the sensor data.

In some implementations, object classes or instances may be described by object constellation models, in which the object classes or instances are represented by features that are geometrically related. For example, an object constellation model may describe the positioning of specific features of object instances relative to one another. The object recognition engine 152 may identify an object based on identifying the features of a particular object and determining that the position of those features relative to one another satisfies the object constellation model.

The object recognition engine 152 may consider other information in identifying objects based on the sensor data received from the one or more sensors 150. For example, the object recognition engine 152 may consider the likely positioning of an object within a particular or environment. For instance, an object that resembles both a table and a cabinet but that is attached to a floor may be identified as a table object instance, since it is more likely that a table would be connected to a floor than would a cabinet. The object recognition engine 152 may also consider the proximity of other identified object instances when identifying new object instances. For example, an object that could be identified as either a television or a microwave but that is positioned near a refrigerator object instance may be identified as a microwave, since it is more likely that a microwave will be near a refrigerator than a television. Other methods of object recognition may be implemented by the object recognition engine 152.

In some implementations, the object recognition engine 152 may have access to information identifying object instances previously identified in the environment 102. Access to such information may enable the object recognition engine 152 to identify a particular object instance in the environment 102 that has been previously identified in the environment 102. For example, the object recognition engine 152 may have access to the local semantic mapping stored at the mapping storage 156 of the autonomous robot 105, or may have access to a database that describes each object instance identified in the environment 102. The object recognition engine 152 may compare features of object instances detected in the environment 102 to features of object instances previously identified in the environment 102 to determine whether the autonomous robot 105 has observed an object instance that was previously observed in the environment 102.

At stage (B), the object recognition engine 152 provides information to the mapping update engine 154 indicating object instances that it detected in the environment 102, and locations of the object instances within the environment 102. For example, based on the object recognition engine 152 determining that the one or more sensors 150 of the autonomous robot 105 observed a plant in the environment 102, the object recognition engine 152 can transmit data to the mapping update engine 154 that indicates features about the plant object instance, including a location of the plant object instance in the environment 102.

The mapping update engine 154 can receive the information from the object recognition engine 152, and can update the local semantic mapping of the environment 102 stored at the mapping storage 156 of the autonomous robot 105. For example, the mapping update engine 154 may access the local semantic mapping stored at the mapping storage 156 of the autonomous robot 105, and determine that the local semantic mapping does not include a plant object instance corresponding to the detected plant object instance, or may determine that the local semantic mapping includes a plant object instance corresponding to the detected plant object instance, but in a different location within the environment 102.

Based on these determinations, at stage (C), the mapping update engine 154 can transmit data to the mapping storage 156 to update the local semantic mapping stored at the mapping storage 156 of the autonomous robot 105. For example, the mapping update engine 154 may transmit data to the mapping storage 156 that causes the mapping storage 156 to augment the local semantic mapping with the newly detected object instance. Adding the object instance to the local semantic mapping may involve, for example, updating a 2D or 3D mapping of the environment 102 to include the object instance, e.g., in a mesh mapping of the environment 102. The portion of the 2D or 3D mapping of the environment 102 corresponding to the identified object may be labelled as the particular object instance.

Adding the object instance to the local semantic mapping may also include assigning a probability to the object instance indicating the likelihood of the object instance being located there. For example, the mapping storage 156 or another component of the system 100 may determine a probability function indicating the likelihood of the object instance being located at the identified location in the environment 102 over time, based on characteristics of the object instance.

If the object instance is one that was previously detected in the environment 102, such that the object instance is already represented in the local semantic mapping of the environment 102, then the mapping storage 156 may simply update the local semantic mapping based on the new observation of the object instance by the autonomous robot 105. For example, if a plant object instance was previously observed in a different location in the environment 102, then an observation of the plant object instance in a different location in the environment 102 may cause the mapping storage 156 or another component to update the probability function associated with the plant object instance to indicate that the different location is the most likely location of the plant object instance in the environment 102.

At stage (D), the mapping update engine 154 can transmit information to the lifelong semantic mapping engine 110 that indicates one or more observations of the autonomous robot 105 that may be incorporated into the semantic mapping stored at the lifelong semantic mapping engine 110. Specifically, the mapping update engine 154 can determine whether one or more of the objects recognized by the object recognition engine 152, or locations of objects recognized by the object recognition engine 152, is substantial and therefore should be incorporated into the semantic mapping stored by the lifelong semantic mapping engine 110. For example, the mapping update engine 154 may determine that one or more of the objects identified by the object recognition engine 152 are not already included in the local semantic mapping stored at the mapping storage 156 of the autonomous robot 105, or that one or more of the identified objects is in a different location than that indicated in the local semantic mapping 105. In response to this determination, the mapping update engine 154 can transmit information, e.g., the observation data identified in FIG. 1A, to the update evaluation engine 112 of the lifelong semantic mapping engine 110.

While in some implementations the mapping update engine 154 may evaluate observations by the autonomous robot 105 to determine whether the observations are sufficiently important to warrant their incorporation into the semantic mapping stored by the lifelong semantic mapping engine 110, in other implementations, the mapping update engine 154 may provide all of the observations of the autonomous robot 105 to the lifelong semantic mapping engine 110. In such an implementation, the mapping update engine 154 or another component of the autonomous robot 105, e.g., the object recognition engine 152, can transmit all observations, e.g., all recognitions of object instances and their locations at the environment 102, to the update evaluation engine 112 of the lifelong semantic mapping engine 110. This removes the need for the mapping update engine 154 to evaluate the importance of specify observations by the autonomous robot 105, instead allowing the lifelong semantic mapping engine 110 to determine which observations are sufficiently important to warrant incorporation into the semantic mapping stored at the environment mapping database 114.

The update evaluation engine 112 receives the information from the mapping update engine 154 that indicates the observations of the autonomous robot 105, and may evaluate the observations to determine whether and how those observations should be incorporated into the semantic mapping of the environment 102 stored at the environment mapping database 114. Based on these determinations, at stage (E), the update evaluation engine 112 can transmit data to the environment mapping engine to update the semantic mapping of the environment 102 stored at the environment mapping database 114.

For example, the update evaluation engine 112 may receive from the mapping update engine 154 observation data that indicates one or more object instances detected by the autonomous robot 105 in the environment 102, as well as locations of the object instances within the autonomous robot 105. The update evaluation engine 112 may access the semantic mapping stored at the environment mapping database 114, and based on the observation data may determine to update the semantic mapping. Updating the semantic mapping stored at the environment mapping database 114 may include adding object instances to the semantic mapping, setting probabilities associated with newly added object instances in the semantic mapping, or adjusting probabilities associated with existing object instances represented in the semantic mapping.

For instance, the update evaluation engine 112 of the lifelong semantic mapping engine 110 may receive observation data from the mapping update engine 154 of the autonomous robot 105 identifying a plant object instance in the environment 102 and a table object instance in the environment 102. The update evaluation engine 112 may access the semantic mapping stored at the environment mapping database 114, and may determine whether the plant and table object instances are represented in the semantic mapping of the environment 102.

Based on determining that the plant object instance is not represented in the semantic mapping stored at the environment mapping database 114, the update evaluation engine 112 may update the semantic mapping stored at the environment mapping engine to include the plant object instance at the location where it was observed by the autonomous robot 105. The update evaluation engine 112 may also associate a probability with the plant object instance, e.g., a probability function that indicates the probability of the plant object instance being located at the particular location within the environment 102 over time. In determining the probability, the update evaluation engine 112 may consider a number of factors. For example, the update evaluation engine 112 may determine that a house plant class of object instances tend to remain in the same location within a property, which may be reflected in the probability function of the plant object instance such that the probability of the plant being located at the identified location decreases relatively slowly over time. Other characteristics of the plant object instance may be considered in determining the probability of the plant object instance being located at the particular location within the property, as discussed in further detail with respect to FIGS. 2 through 4.

The update evaluation engine 112 may perform a similar evaluation with respect to the table object instance identified in the environment 102. For example, the update evaluation engine 112 may access the semantic mapping at the environment mapping database 114 and determine that the table object instance is already included in the semantic mapping. The update evaluation engine 112 may compare the location of the table object instance identified in the observation data received from the autonomous robot 105 with a location within the environment 102 associated with the table object instance that is specified by the semantic mapping. If the location indicated by the observation data is generally the same as the location indicated by the semantic mapping, then the observation operates to reinforce the table object instance being located at that location. Therefore, the update evaluation engine 112 may update a probability associated with the table object instance in the semantic mapping.

For example, the update evaluation engine 112 may update a probability function indicating the likelihood of the table object instance being located in that location over time to increase the probability of the table object being located in that location, and adjusting the function so that the probability of the table being located there decreases more slowly over time, since it appears that the location of the table object instance is relatively static. Alternatively, if the location where the autonomous robot 105 observed the table object instance is inconsistent with a previous location where the table object instance was located, then the update evaluation engine 112 may add a second instance of the table object instance to the semantic mapping. For example, the update evaluation engine 112 may associate the new location with the table object instance, and may assign a probability to that location, such that the table object instance in the semantic mapping is associated with two possible locations, each with a corresponding probability of the table object instance being located there. Alternatively, the update evaluation engine 112 may create a new table object instance in the semantic mapping and associate a probability with that table object instance, such that the semantic mapping includes two identical table object instances, each with a corresponding probability.

The update evaluation engine 112 may also determine that certain observations of the autonomous robot 105 indicated in the observation data received from the mapping update engine 154 are insufficient to justify updating the semantic mapping stored at the environment mapping database 114. For example, if the observation data indicates that a relatively stationary object instance, such as a couch, is detected as being in the same location, the update evaluation engine 112 may forgo updating the semantic mapping to reflect that observation. Similarly, if an observation of the autonomous robot 105 has a low confidence of being accurate, due to the distance from which the autonomous robot 105 may the observation or otherwise, then the update evaluation engine 112 may determine not to update the semantic mapping to reflect that observation.

At stage (F), the mapping distributor 116 can access the updated semantic mapping at the environment mapping database 114. For example, the mapping distributor 116 may be configured to provide autonomous robots such as the autonomous robot 105 with update semantic mappings of the environment 102. The mapping distributor 116 may be configured to do so periodically, whenever changes are made to the semantic mapping stored at the environment mapping database 114, in response to a request from an autonomous robot such as the autonomous robot 105, based on determining that a new autonomous robot has been added to the system 100, or based on other conditions. The mapping distributor 116 can access the updated semantic mapping stored at the environment mapping database 114, and can identify one or more autonomous robots to receive the update semantic mapping.

The mapping distributor 116 can then transmit the updated semantic mapping to the mapping storage 156 at stage (G). For example, the mapping distributor 116 can transmit the updated semantic mapping to one or more identified autonomous robots, including the autonomous robot 105, over one or more wired or wireless networks, such as one or more LANs or WANs. The mapping storage 156 of the autonomous robot 105 can receive the updated semantic mapping from the mapping distributor 116, and can store the updated semantic mapping at the mapping storage 156.

In some implementations, storing the updated semantic mapping at the mapping storage 156 can involve replacing the local semantic mapping stored at the mapping storage 156 with the updated semantic mapping. In other implementations, the mapping storage 156 or another component of the autonomous robot 105 may update the local semantic mapping stored at the mapping storage 156 based on the updated semantic mapping received from the mapping distributor 116. For example, the mapping storage 156 or another component of the autonomous robot 105 may compare the updated semantic mapping to the local semantic mapping stored at the mapping storage 156 to identify differences between the local semantic mapping and the updated semantic mapping. The mapping storage 156 or another component of the autonomous robot 105 can update the local semantic mapping to incorporate features of the update semantic mapping where appropriate.

In some examples, updating the local semantic mapping may allow the autonomous robot 105 to operate with greater accuracy, since the local semantic mapping may include some features or object instances that are not identified in the updated semantic mapping. For instance, the local semantic mapping may include features, such as object instances, that have been added to the local semantic mapping based on observations by the autonomous robot 105 of the environment immediately surrounding the autonomous robot 105. By updating the local semantic mapping rather than replacing the local semantic mapping with the updated semantic mapping, the autonomous robot 105 may maintain its ability to operate in its current location within the environment 102 with precision.

After updating the local semantic mapping stored at the mapping storage 156 of the autonomous robot 105, the autonomous robot 105 can use the updated local semantic mapping to navigate through and interact with the environment 102. To do so, at stage (H), a controller 158 of the autonomous robot 105 may access the updated local semantic mapping at the mapping storage 156. The controller 158 may be a processor or other component capable of generating instructions to control one or more actuators 160 of the autonomous robot 105.

For example, the controller 158 may be a component configured to receive an instruction for the autonomous robot 105 to navigate to the location of a particular object instance in the environment 102. To generate instructions to control the autonomous robot 105 to navigate to that location, the controller 158 may access the updated local semantic mapping at the mapping storage 156. The controller 158 may determine, from the updated local semantic mapping of the environment 102 a particular location in the environment 102 where the identified object instance is most likely located. For example, the controller 158 may determine, based on a probability function associated with the particular object instance and a current time, a most probable location of the particular object instance within the environment 102. The controller 158 may also determine a current location of the autonomous robot 105 within the environment 102, and based on the current location of the autonomous robot 105 and the most likely location of the particular object instance in the environment 102, may determine a path of movement of the autonomous robot 105 to navigate to the location of the particular object instance. The controller 158 may generate instructions for controlling actuators 160 of the autonomous robot 105 to navigate the autonomous robot 105 to the location of the particular object instance.

At stage (I), the controller 158 may control actuators 160 of the autonomous robot 105 using the generated instructions. The one or more actuators 160 may include, for example, one or more transport mechanisms of the autonomous robot 105, e.g., wheels, tread, legs, or other transportation mechanism of the autonomous robot 105, and also include one or more actuators 160 for controlling the autonomous robot 105 to interact with objects in the environment, such as an arm, claw, or suction cup of the autonomous robot 105. The actuators 160 may also include actuators 160 for allowing the autonomous robot 105 to observe the environment 102, for example, actuators 160 for controlling the positioning of cameras or other of the one or more sensors 150 of the autonomous robot 105. For example, based on the controller 158 generating instructions to navigate the autonomous robot 105 to the location of a particular object instance in the environment 102, the controller 158 can control one or more wheels of the autonomous robot 105 to navigate the autonomous robot 105 to the location of the particular object instance.

Figure 2:
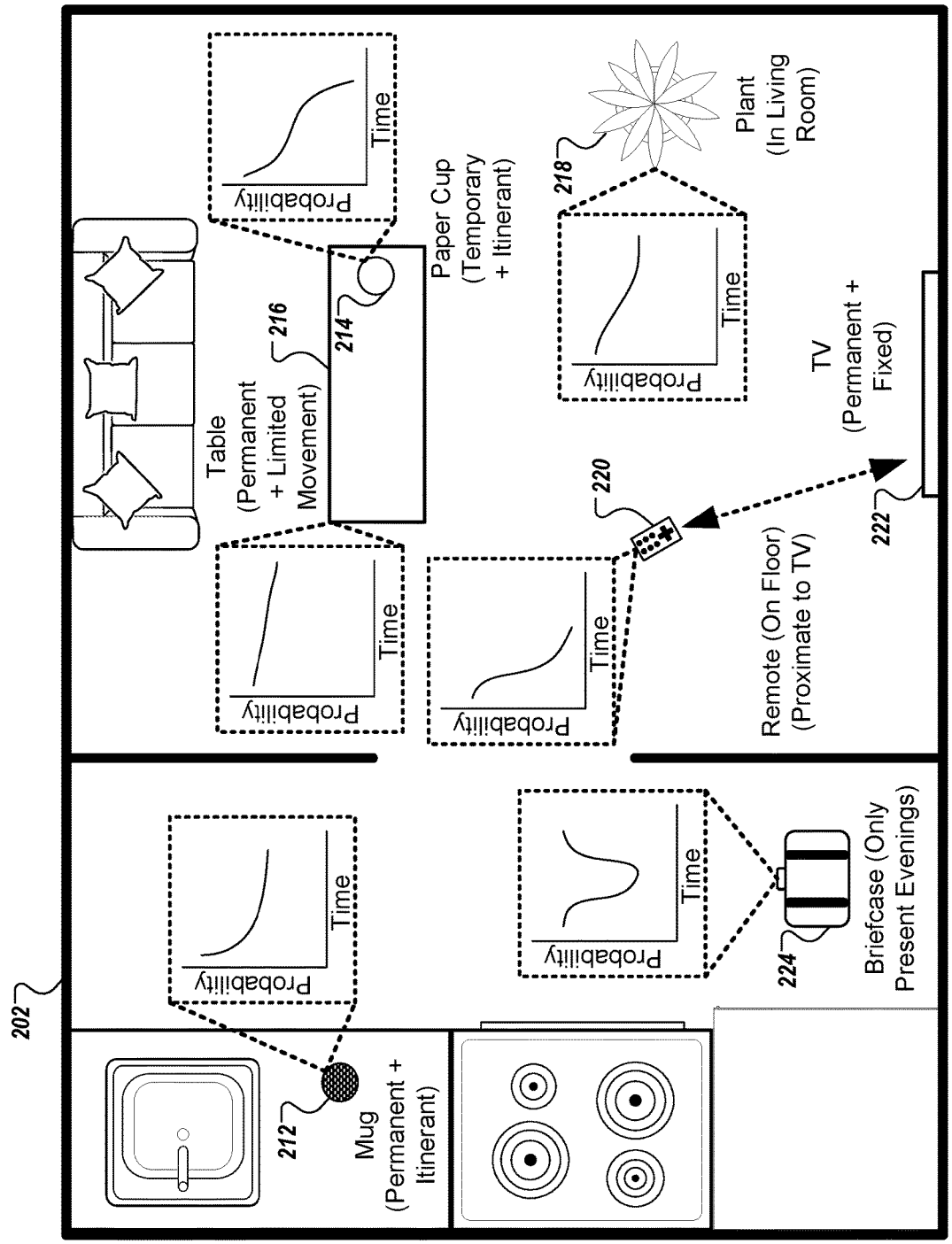
FIG. 2 depicts example factors for providing lifelong semantic mapping.

FIG. 2 depicts examples of factors that may be considered in providing lifelong semantic mapping. Specifically, FIG. 2 depicts an environment 202 including a number of object instances. Each object instance may be represented in a semantic mapping of the environment 202, e.g., a semantic mapping stored at an environment mapping database 114 of an lifelong semantic mapping engine 110, as discussed with respect to FIG. 1B. Each object instance represented in the semantic mapping of the environment 202 may also be associated with one or more probabilities that each indicate the likelihood of the object instance being in a particular corresponding location within the environment 102.

Each probability may be represented as a probability function, such as a logistic, logarithmic, exponential, Gaussian, linear, or other function. A probability function associated with a particular object instance and location within the environment 202 may indicate the probability of the particular object instance being located at the location within the environment 202 over time. The probability function may be determined based on a number of factors, including characteristics of the particular object instance, a class of the particular object instance, relationships between the particular object instance and other object instances, relationships between the particular object instance and locations within the environment 202, may be determined based on a confidence of identification of the particular object instance, may be determined based on how recently the particular object instance has been observed in the environment 202, or may be determined based on other factors.

For example, a semantic mapping of the environment 202 may include a coffee mug 212 and a paper cup 214 that are each associated with one or more locations within the environment 202. Probabilities associated with the locations where the coffee mug 212 and paper cup 214 are indicated as being located within the environment 202 may be determined in part based on how recently an observation of the coffee mug 212 and paper cup 214 at those respective locations took place. For example, if the coffee mug 212 was observed in its location only a few minutes ago, it is much more likely that the coffee mug 212 will be at that location than if it was most recently observed in that location several days prior.

Characteristics of a coffee mug class of objects and of a paper cup class of object instances may also influence the respective probabilities of the coffee mug 212 and paper cup 214 being located in particular locations within the environment 202. For example, both the coffee mug class of object instances and the paper cup class of object instances may be associated with an itinerant characteristic that indicates that object instances of that class move frequently within an environment. Because of this characteristic, a probability associated with a particular location where the coffee mug 212 or the paper cup 214 may be located may generally decrease rapidly over time, as it is unlikely that either object instance will be located in the same location for an extended period of time. Thus, if an autonomous robot such as the autonomous robot 105 observes either the mug 212 or cup 214, the location where the mug 212 or cup 214 was observed may be assigned a probability that quickly declines over time, since it is unlikely that, for example, the mug 212 or cup 214 will be located in the same location several hours or days later.

In addition, classes of object instances, such as classes of coffee mug object instances and of paper cup object instances, may each be associated with a characteristic that indicates an expected lifetime of object instances of that class. Generally, coffee mug object instances are somewhat permanent object instances within an environment, such that, while the location of the coffee mug may change relatively frequently, the coffee mug tends to be located somewhere in the environment for a long period of time. That is, it is unlikely that a user of the environment will dispose of the coffee mug. However, this is not the case for paper cup object instances, which tend to both move relatively frequently within an environment and be quickly disposed of by users of the environment. Thus, the coffee mug 212 object instance may be associated with a permanent characteristic and the paper cup 214 object instance associated with a temporary characteristic.

Probability functions corresponding to the mug 212 and cup 214 in the semantic mapping of the environment 202 may differ based on their expected lifetime characteristic. While both object instances may have similar probabilities over short time spans, due to each being within an itinerant class of object instances, the probability of the paper cup 214 being located in the particular location or other locations in the environment 202 may decline more quickly over a longer time frame compared to the coffee mug 212, since users of the environment 202 will likely dispose of the paper cup 214 in a few hours or days, which is not the case for the coffee mug 212. Thus, as shown in FIG. 2, the probability of the paper cup 214 object instance being located in a particular location within the environment 202 may decline rapidly beyond a particular time, compared with the coffee mug 212 object instance that is more likely to remain somewhere within the environment 202.

Probabilities associated with particular object instances may also reflect observations of the particular object instance over time. For example, the system 100 of FIGS. 1A and 1B may record multiple observations of a particular object over time and, based on the multiple observations of the object instance over time, determine how frequently or how far a particular object instance moves.

Such a concept may be relevant, for example, to the table 216 object instance in the environment 202 depicted in FIG. 2. Multiple observations of the table 216 object instance may indicate that the table 216 object instance moves frequently, but only by small amounts. For example, the table 216 may be observed as being closer to or further away from a couch within the environment 202, but is also within this very limited range of locations. Thus, the table 216 object instance may be associated with a characteristic indicating that the table 216 has limited movement in the environment 202, which can then impact the probability of the table 216 being located in a particular location within the environment 202. For example, a probability function for the table 216 may reflect that the table 216 has a relatively high probability of being located in the same location in the environment 202 over time, as shown in FIG. 2.

In some implementations, autonomous robots such as the autonomous robot 105a, 105b observe the table 216 in one of two possible locations, e.g., close to or pushed further away from the couch located in the environment 202. As a result, a semantic mapping of the environment 202 may include two locations for the table 216 that each has a corresponding probability that may be time-variant. These probabilities may be related, e.g., such that a sum of the two probabilities at any given point time is near certainty, i.e., a probability of 1.0.

Similarly, object instances in an environment such as the environment 202 may be identified as object instances that are associated with a particular room or other area of an environment or identified as being of a class of object instances that are typically associated with a particular room or area of an environment. Thus, in one example, a toothbrush object instance may be associated with a location corresponding to a bathroom and given a probability indicating that the toothbrush object instance is more likely located in the bathroom than in a kitchen. In contrast, a coffee pot object instance may be associated with a location and probability indicating that the coffee pot object instance is likely located in a kitchen, and not in a bathroom.

The same may also be true where specific object instances frequently appear in a particular room or area of an environment. For example, autonomous robots in the environment 202 of FIG. 2 may frequently observe the plant 218 object instance located in a living room of the environment 202. While the plant 218 object instance may move frequently within the living room of the environment 202, because the plant 218 is never observed outside of that particular room, a probability associated with the plant 218 object instance may indicate that the plant 218 is much more likely to be located in one or more locations in an area of the environment 202 designated as a living room. A probability associated with the plant 218 object instance may therefore indicate a relatively high confidence of the plant 218 being located at an observed location, if that location is within the room or area of the environment 202 where the plant 218 is frequently observed.

In other examples, a lifelong semantic mapping of an environment may consider that two or more object instances are related, such that the proximity of the object instances to one another may be considered in determining the probability of one of the object instances being in particular locations. For example, a pair of matching chairs may likely be located near one another, e.g., as a part of a dining room set, or, as shown in FIG. 2, a television remote 220 object instance may likely be located near a television 222 object instance.

In some implementations, a system such as the system 100 may determine that two object instances are related based on characteristics of the object instances, such as in the case of the television remote 220 and television 222. In other implementations, the system may determine a relationship between two or more object instances based on observations of the object instances. For example, based on the system obtaining numerous observations of a particular coffee mug object instance sitting on a particular desk object instance, the system may establish a relationship between the desk and the coffee mug. Thus, the system may determine that the coffee mug is more likely to be located in a location that is proximate to the desk than in other locations.

A probability associated with a particular location where an object instance may be located can also reflect whether the particular location is a natural location for the object instance within an environment. For example, based on characteristics of a class of the object instance, or based on repeated observations of the object instance, the system may determine one or more typical types of locations where an object instance is located.

In the environment 202 depicted in FIG. 2, for example, the television 222 object instance may be an object that the system knows or learns over multiple observations is typically mounted to wall of the environment 202. Therefore, if an autonomous robot observes the television 222 object instance sitting on a floor in the environment 202, the system may assign the observed location with the television 222, but assign the location a probability function indicating that the television 222 is unlikely to be in that location for a long period of time, since it is typically mounted to a wall of the property. Similarly, a television remote 220 may be a class of object that the system knows or observes is typically located on a table. Therefore, if an autonomous robot observes the television remote 220 sitting on a floor of the environment 202, a probability function associated with that location may indicate that the television remote 220 is unlikely to be in that location for a long period of time.

The probability associated with the television remote 220 in FIG. 2 demonstrates an example probability function that may reflect both the likelihood of the television remote 220 being located proximate to the television 222, as well as the likelihood of the television remote being located on a floor of the environment 202 for only a short period of time. Specifically, because the location of the television remote 220 is proximate to the television 222, the semantic mapping indicates that the probability of the television remote 220 being in that location over the near future is relatively high. However, this probability decreases quickly due to the location's being on a floor of the environment 202 where the television remote 220 is rarely observed, or where a television remote class of objects is unlikely to be located for a long period of time.

A semantic mapping of an environment such as the environment 202 may also consider the presence of an object instance within the environment or a particular location within the environment at various times of day or on various days. For example, a briefcase 224 object instance may be observed in the environment 202 and a location associated with the briefcase 224 corresponding to where the briefcase is observed in the environment 202. While the briefcase 224 may be observed in the location frequently, the system may determine that the briefcase 224 is only observed in that location during certain hours of the day or on certain days. During other times, the briefcase 224 may be observed in different locations at the environment 202, e.g., in a home office area of the environment 202 (not shown), or may not be observed in the environment 202 at all. A probability associated with the briefcase 224 may reflect this pattern of observation, such that a semantic mapping of the environment 202 indicates a relatively high probability of the briefcase 224 being in the particular location during certain times or days, and a relatively low probability of the briefcase 224 being in the particular location during other times or on other days.

Figure 3:
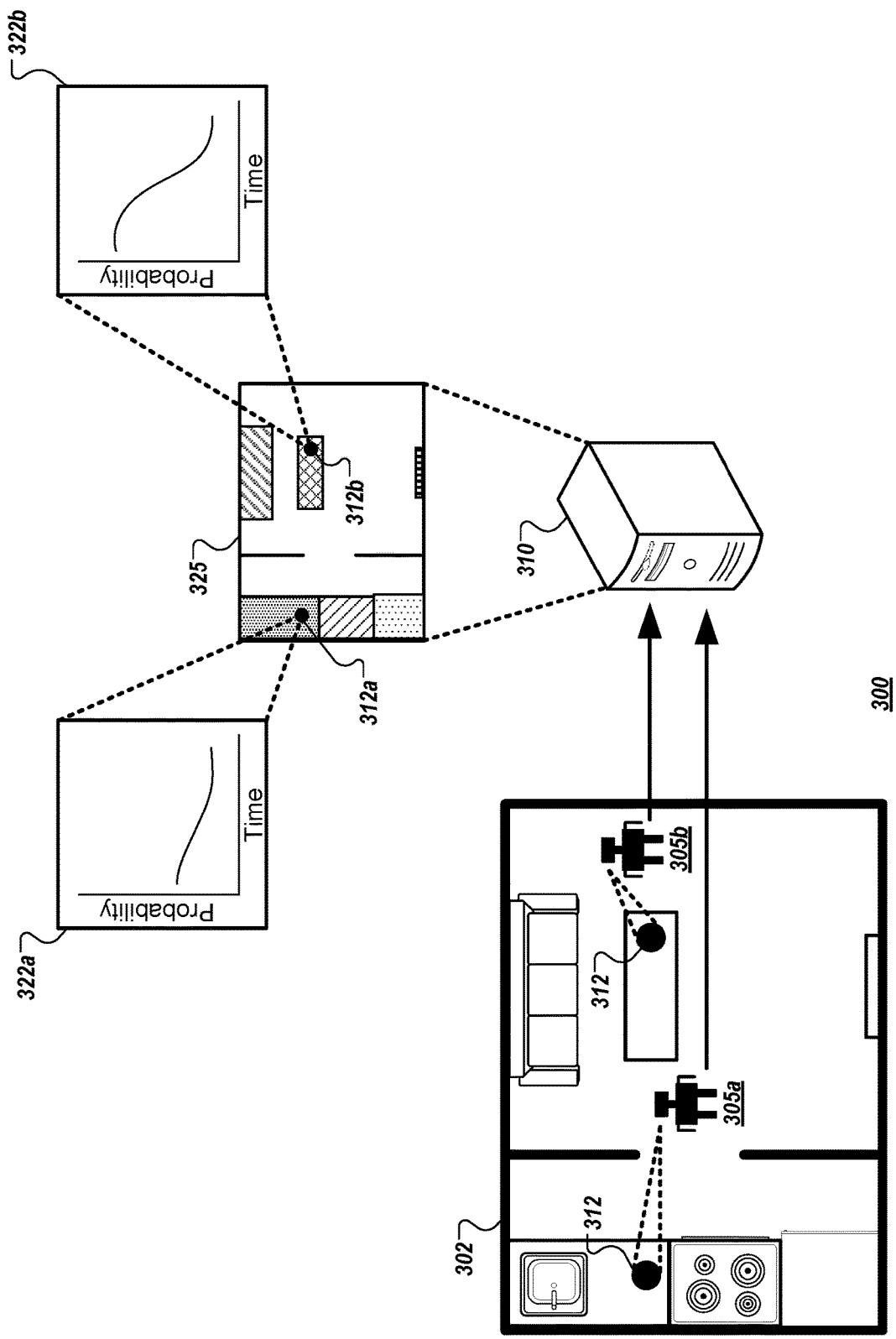
FIG. 3 depicts an example system for determining the location of an object instance within an environment.

FIG. 3 depicts an example system 300 in which multiple locations and corresponding probabilities are assign to a single object instance. Briefly, the system 300 is configured to provide lifelong semantic mapping of an environment 302. The system 300 includes one or more autonomous robots 105a, 105b similar to the autonomous robots 105a, 105b of FIG. 1A that are configured to make observations at the environment 302, and further includes an lifelong semantic mapping engine 310 similar to the lifelong semantic mapping engine 110 of FIGS. 1A and 1B. The lifelong semantic mapping engine 310 stores a semantic mapping 325 of the environment 302, and is configured to update the semantic mapping 325 based on observation data received from the one or more autonomous robots 305a, 305b.

In FIG. 3, the autonomous robots 305a, 305b have each identified a particular coffee mug 312 object instance, and have transmitted observation data to the lifelong semantic mapping engine 310 indicating the respective observations of the coffee mug 312 object instance. Because the observations occur near in time, however, the lifelong semantic mapping engine 310 may determine that at least one of the observations of the coffee mug 312 are erroneous. Therefore, the lifelong semantic mapping engine 310 may generate two representations of the coffee mug 312 object instance in the semantic mapping 325. While shown in FIG. 3 as two distinct representations 312a, 312b of the coffee mug 312 object instance, in other implementations, the semantic mapping 325 may specify the coffee mug 312 as a single object instance with two distinct probabilities corresponding to the two potential locations of the coffee mug 312 object instance in the environment 302.

For example, based on receiving observation data from each of the autonomous robots 305a, 305b that identify the coffee mug 312, the lifelong semantic mapping engine 310 may generate two representations 312a, 312b corresponding to the coffee mug 312 in the semantic mapping 325, where each of the representations 312a, 312b corresponds to a particular location where the observation data indicated that the coffee mug 312 was seen in the environment 302. The observation data provided to the lifelong semantic mapping engine 310 may provide additional information, for example, a level of confidence in the identification by each of the autonomous robots 305a, 305b. The lifelong semantic mapping engine 310 may use this form of "voting" from multiple autonomous robots 305a, 305b to determine a most likely location of the coffee mug 312 in the environment 302.

For example, the observation data received from the autonomous robot 305a may indicate a moderate confidence that the autonomous robot 305a has identified the coffee mug 312 accurately, based on the autonomous robot 305a being fairly far from what it identified as the coffee mug 312 at the time of the identification, or having a partially obstructed view of the object identified as the coffee mug 312 when it made the identification. In contrast, the autonomous robot 305b may indicate a higher confidence that the autonomous robot 305b has correctly identified the coffee mug 312, based on the autonomous robot 305b being fairly close to the object when performing the identification, and having an unobstructed view of the object. Based on this information, and other factors such as those considered at FIG. 2, the lifelong semantic mapping engine 310 can estimate a probability 322a, 322b of the coffee mug 312 being at each of the locations at the environment 302 identified by the autonomous robots 305a, 305b.

As shown in FIG. 3, for instance, the lifelong semantic mapping engine 310 may assign a first probability to the location where the autonomous robot 305a observed the coffee mug 312, and a second probability to the location where the autonomous robot 305b observed the coffee mug 312. Based on the observation of the autonomous robot 305a being an identification of the coffee mug 312 having a lower confidence than the identification of the coffee mug 312 by the autonomous robot 305b, the lifelong semantic mapping engine 310 may assign a probability to the representation 312a of the coffee mug 312 in the semantic mapping 325 that is generally lower than the probability assigned to the representation 312b of the coffee mug 312.

An autonomous robot, such as one of the autonomous robots 305a, 305b may later use the semantic mapping 325 including the two representations 312a, 312b of the coffee mug 312 to locate and interact with the coffee mug 312 in the environment 302. For example, a user of the environment 302 may subsequently provide an instruction to the autonomous robot 305a to "bring my coffee mug." The semantic mapping 325 including the two representations 312a, 312b of the coffee mug 312 may be stored at the autonomous robot 305a, such that the autonomous robot 305a can access the semantic mapping 325 and identify a particular location within the environment 302 where the coffee mug 312 is most likely located, based on the probabilities associated with the two representations 312a, 312b of the coffee mug 312.

Having identified a most likely location of the coffee mug 312, i.e., the location associated with the representation 312b of the coffee mug 312, the autonomous robot 305a can navigate to the location of the coffee mug 312 to retrieve the coffee mug 312. In the event that the coffee mug 312 is not located in this location, the autonomous robot 305a may then determine to navigate to the location associated with the other representation 312b of the coffee mug 312 to attempt to retrieve the coffee mug from that location. In this way, the "voting" process enables the autonomous robot 305a to not only search for the coffee mug 312 in its most likely location, but to also have alternate locations in the environment 302 to search for the coffee mug 312 in the event that it is not located in the first location searched.

Figure 4:
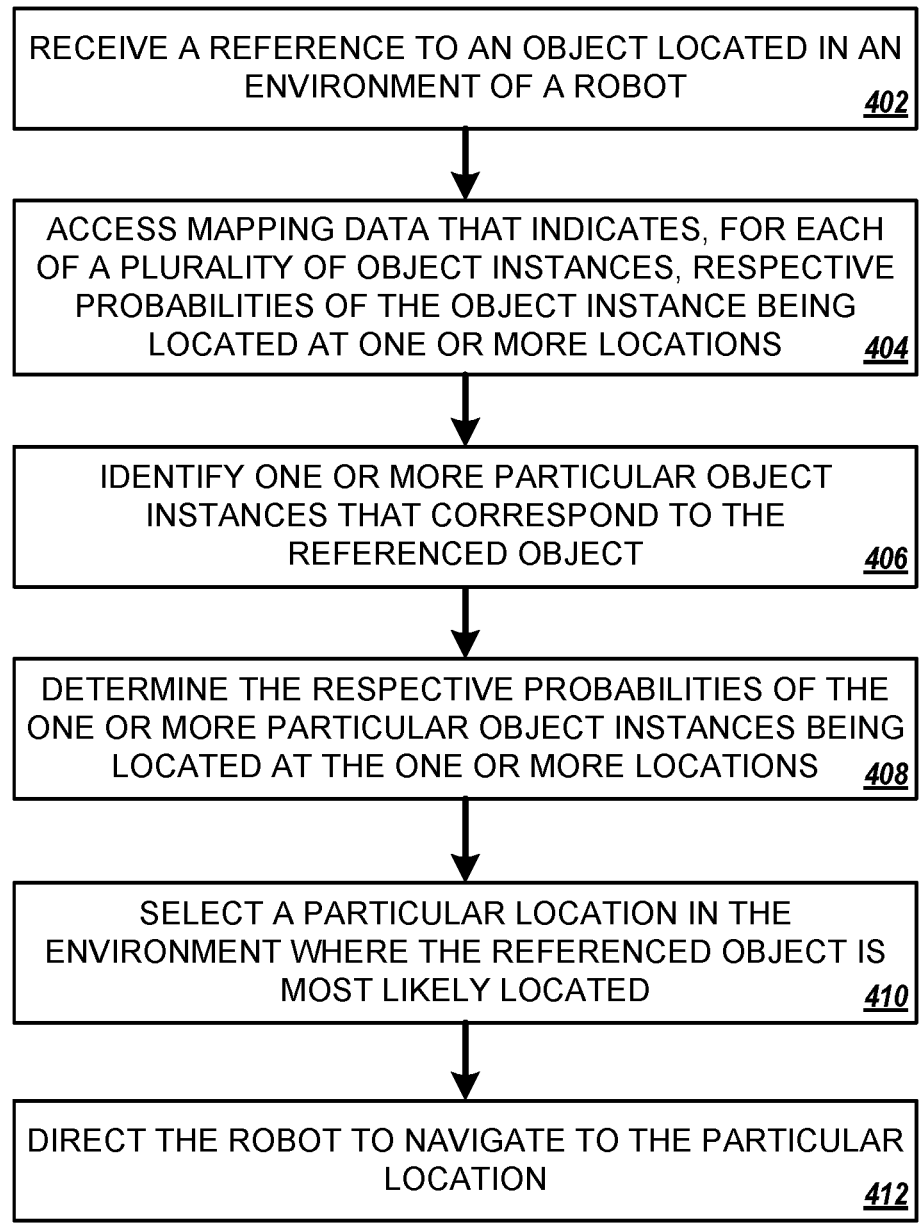
FIG. 4 is a flowchart of an example process for determining the location of an object instance within an environment.

FIG. 4 is a flowchart of an example process 400 for performing lifelong semantic mapping and using lifelong semantic mapping to control an autonomous robot in an environment. In some implementations, the process 400 may be performed by the system 100 of FIGS. 1A and 1B, e.g., by the autonomous robot 105 of FIG. 1B.

The system receives a request that references an object located in an environment of the robotic system (402). For example, the autonomous robot 105 may receive a command from a user of the environment 102 that specifies an object instance located in the environment 102. The request may request, for instance, that the autonomous robot 105 navigate to the location of the object instance, or perform some action with respect to the object instance, such as retrieve the object instance, move the object instance to another location within the environment 102, or perform another action with respect to the object instance. In some examples, the request may be received as a spoken command, or as another form of request, e.g., a textual request, request submitted by pressing a particular button of the autonomous robot 105, or may be any other request. In some examples, the autonomous robot 105 may receive the request from one or more other systems, e.g., over one or more wired or wireless networks, such as when the request is submitted by a user at a computer that is in communication with the autonomous robot 105.

The system accesses mapping data that indicates, for each of a plurality of object instances, respective probabilities of the object instance being located at one or more locations in the environment (404). The respective probabilities of the object instance being located at each of the one or more locations in the environment are each based at least on an amount of time that has passed since a prior observation of the object instance was made.

For example, the autonomous robot 105 may access, at the mapping storage 156 of autonomous robot 105 or at the lifelong semantic mapping engine 110, a semantic mapping of the environment 102. The semantic mapping may specify, for each of a plurality of object instances, one or more probabilities that are each associated with a particular location within the environment 102 and represent the probability of the object instance being located at the particular location within the environment 102. Each of the probabilities may be, for example, a probability function that indicates the probability or confidence of the object instance being located at the particular location over time. Thus, each of the probabilities specified in the semantic mapping is determined and is dependent at least on an amount of time that has passed since a prior observation of the object instance was made. Such a probability generally reflects a decreasing confidence in the location of a particular object the more time that has passed since the object instance was last observed by the autonomous robot 105 or another autonomous robot, but may also consider any number of other factors, for example, as discussed with respect to FIGS. 2 and 3.

The system identifies, from among the plurality of object instances, one or more particular object instances that correspond to the object referenced by the request (406). For example, upon accessing the semantic mapping of the environment 102, the autonomous robot 105 may identify one or more object instances in the semantic mapping that correspond to the object referenced by the request. Each of the identified object instances may be associated with one or more probabilities that each correspond to a particular location within the environment 102 and indicate a likelihood of the object instance being located at the particular location within the environment. For example, the autonomous robot 105 may receive a request that identifies a coffee mug, e.g., from a user of the environment 102. The autonomous robot 105 may access a semantic mapping of the environment 102, e.g., at the mapping storage 156, and may identify from the semantic mapping one or more coffee mug object instances represented in the semantic mapping. Each of the coffee mug object instances may be associated with one or more probabilities that each indicate a likelihood of the corresponding coffee mug object instance being located at a particular location in the environment 102.

The system determines, based at least on the mapping data, the respective probabilities of the one or more particular object instances being located at the one or more locations in the environment (408). For example, based on the autonomous robot 105 identifying one or more object instances in the semantic mapping of the environment 102 that correspond to the object referenced by the request, the autonomous robot 105 may determine the probabilities of the corresponding object instances being located in one or more locations of the environment 102. Where each of the probabilities is a time-dependent probability function, for example, the autonomous robot 105 may determine the respective probabilities of the one or more particular object instances being located at one or more locations in the environment 102 by calculating the value of the function at the time of the request.

For instance, the autonomous robot 105 may identify one or more coffee mug object instances in the semantic mapping of the environment 102, where each of the object instances is associated with one or more probabilities that is each a function and corresponds to a particular location within the environment 102. The autonomous robot 105, e.g., the controller 158 of the autonomous robot 105, may compute a result of each function to determine the probability of the coffee mug being located at each of the particular locations within the environment 102.

The system selects, based at least on the respective probabilities of the one or more particular object instances being located at the one or more locations in the environment, a particular location in the environment where the object referenced by the request is most likely located (410). For example, after computing the probabilities of the identified object instances being at each of the locations corresponding to the probabilities that are associated with each of the object instances, the autonomous robot 105 can select a particular location in the environment 102 where the object referenced by the request is most likely located. Selecting the particular location in the environment 102 where the object referenced by the request is most likely located may be, for example, the particular location that has the highest computed probability for the time of the request.

For example, based on the autonomous robot 105 computing probabilities for each of multiple locations where one or more coffee mug object instances may be located, the autonomous robot 105, e.g., the controller 158 of the autonomous robot 105, can select a particular location within the environment 102 where the coffee mug is mostly likely located, based on the probabilities. The autonomous robot 105 may select the particular location associated with the particular coffee mug object instance having the highest probability, indicating the highest confidence of the coffee mug object instance being in that location.

The system directs a robotic system to navigate to the particular location (412). For example, based on the autonomous robot 105 selecting a particular location based on the probabilities associated with the one or more locations of each of the one or more object instances that correspond to the object referenced in the request, the autonomous robot 105 can generate instructions to navigate the autonomous robot 105 to the particular location. The autonomous robot 105 can use the generated instructions to navigate the autonomous robot 105 to the particular location. For example, the controller 158 of the autonomous robot 105 can use the generated instructions to cause actuators 160 of the autonomous robot 105 to move the autonomous robot 105 to the particular location. For instance, based on the autonomous robot 105 selecting a particular location in the environment 102 where the autonomous robot 105 determines that the coffee mug referenced in the request is most likely located, the controller 158 of the autonomous robot 105 can generate instructions and use those instructions to control the actuators 160 to cause the autonomous robot 105 to navigate to the particular location.

In addition to navigating to the particular location, the autonomous robot 105 can also interact with the object referenced by the request, for example, by picking up and retrieving the object, moving the object to another location, or otherwise interacting with the object. In some examples, if the autonomous robot 105 navigates to the particular location and does not locate the object there, the autonomous robot 105 may select a different location within the environment 102, e.g., a location that is associated with a second-highest probability, and may navigate to that location to attempt to locate the object referenced by the request. The autonomous robot 105 may continue this process until the autonomous robot 105 locates the referenced object, for example, by locating the object at one of the locations specific by the mapping data, or by observing the object within the environment while moving through the environment. As the autonomous robot 105 moves through the environment 102 and locates or fails to locate the object referenced by the request, the autonomous robot 105 may communicate information, for example, to the lifelong semantic mapping engine 110, to update the semantic mapping of the environment 102 to more accurately reflect the location of objects, including the object referenced by the request, in the semantic mapping.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development or processing of speech inputs for use with applications installed on user devices, the described features may also be used with respect to machines, other devices, robots, or other systems. For example, the described systems and methods may be used to improve user interactions with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method, comprising:
   receiving a reference to a particular object in an environment of a mobile robot;
   accessing data that identifies a known object and probability information for the known object, wherein the probability information indicates probabilities of the known object being located at various locations in the environment;
   determining, by a processor, a match between the particular object and the known object;
   in response to determining a match between the particular object and the known object, using the probability information for the known object to predict a first location of the particular object;
   determining, by the processor, that the particular object is not at the first location, and in response, using the probability information for the known object to predict a second location of the particular object; and
   directing the robot to navigate to the second location.

2. The method of claim 1, wherein the data that identifies the known object and the probability information for the known object comprises a map of the environment.

3. The method of claim 1, wherein the probability information for the known object is based on prior observations of locations of the known object in the environment.

4. The method of claim 3, comprising adjusting the probability information for the known object based on ages of the prior observations.

5. The method of claim 1, wherein using the probability information for the known object to predict the first location of the particular object comprises selecting as the first location a location in the environment where the known object is assigned the highest probability of being located.

6. The method of claim 5, wherein using the probability information for the known object to predict the second location of the particular object comprises selecting as the second location a location in the environment where the known object is assigned a probability lower than the highest probability.

7. The method of claim 1, wherein determining that the particular object is not at the first location comprises navigating the robot to the first location, and using the robot to acquire an observation of the first location that indicates the robot is not at the first location.

8. The method of claim 1, comprising using the robot to interact with the particular object upon the robot's arrival at the second location.

9. The method of claim 1, comprising updating the probability information for the known object based on determining that the particular object is not at the first location.

10. The method of claim 1, wherein the probability information for the known object is based on spatial relationships between the known object and other known objects in the environment.

11. A system comprising:
    one or more processors configured to execute computer program instructions; and
    one or more computer-storage media encoded with computer programs that, when
    executed by the one or more processors, cause the system to perform operations comprising:

receiving a reference to a particular object in an environment of a mobile robot;

accessing data that identifies a known object and probability information for the known object, wherein the probability information indicates probabilities of the known object being located at various locations in the environment;

determining a match between the particular object and the known object;

in response to determining a match between the particular object and the known object, using the probability information for the known object to predict a first location of the particular object;

determining that the particular object is not at the first location, and in response, using the probability information for the known object to predict a second location of the particular object; and directing the robot to navigate to the second location.

12. The system of claim 11, wherein the data that identifies the known object and the probability information for the known object comprises a map of the environment.

13. The system of claim 11, wherein the probability information for the known object is based on prior observations of locations of the known object in the environment.

14. The system of claim 13, wherein the operations comprise adjusting the probability information for the known object based on ages of the prior observations.

15. The system of claim 11, wherein using the probability information for the known object to predict the first location of the particular object comprises selecting as the first location a location in the environment where the known object is assigned the highest probability of being located.

16. The system of claim 15, wherein using the probability information for the known object to predict the second location of the particular object comprises selecting as the second location a location in the environment where the known object is assigned a probability lower than the highest probability.

17. The system of claim 11, wherein determining that the particular object is not at the first location comprises navigating the robot to the first location, and using the robot to acquire an observation of the first location that indicates the robot is not at the first location.

18. The system of claim 11, wherein the operations comprise using the robot to interact with the particular object upon the robot's arrival at the second location.

19. The system of claim 11, wherein the operations comprise updating the probability information for the known object based on determining that the particular object is not at the first location.

20. One or more computer-readable devices storing software comprising instructions executable by one or more computers which, upon such execution, cause the one or more computers to perform operations comprising:

receiving a reference to a particular object in an environment of a mobile robot;

accessing data that identifies a known object and probability information for the known object, wherein the probability information indicates probabilities of the known object being located at various locations in the environment;

determining a match between the particular object and the known object;

in response to determining a match between the particular object and the known object, using the probability information for the known object to predict a first location of the particular object;

determining that the particular object is not at the first location, and in response, using the probability information for the known object to predict a second location of the particular object; and directing the robot to navigate to the second location.

* * * * *